US012684356B2

(12) United States Patent
Teel

(10) Patent No.: US 12,684,356 B2
(45) Date of Patent: Jul. 14, 2026

(54) SECURITY CUFF FOR PREVENTING COMMUNICATION OF WIRELESS SIGNALS

(71) Applicant: Sean C. Teel, Virginia Beach, VA (US)

(72) Inventor: Sean C. Teel, Virginia Beach, VA (US)

(73) Assignee: Sean C. Teel, Virginia Beach, VA (US)

( * ) Notice: Subject to any disclaimer, the term of this patent is extended or adjusted under 35 U.S.C. 154(b) by 288 days.

(21) Appl. No.: 18/507,554

(22) Filed: Nov. 13, 2023

(65) Prior Publication Data

US 2024/0163675 A1 May 16, 2024

Related U.S. Application Data

(60) Provisional application No. 63/383,300, filed on Nov. 11, 2022.

(51) Int. Cl.
| | |
|---|---|
| *H04W 12/33* | (2021.01) |
| *H04W 12/08* | (2021.01) |
| *H05K 9/00* | (2006.01) |

(52) U.S. Cl.
CPC ........... *H04W 12/33* (2021.01); *H04W 12/08* (2013.01); *H05K 9/0007* (2013.01)

(58) Field of Classification Search
CPC ....... H04W 12/33; H04W 12/08; H04W 4/80; H04W 12/06; H04W 12/065; H05K 9/0043
See application file for complete search history.

(56) References Cited

U.S. PATENT DOCUMENTS

| | | | | |
|---|---|---|---|---|
| 8,723,053 | B2 * | 5/2014 | Winch ................. | H05K 9/0043 |
| | | | | 174/382 |
| 9,345,178 | B2 * | 5/2016 | Davis ..................... | H01R 31/06 |
| 9,655,419 | B2 * | 5/2017 | Nash ....................... | A45C 11/00 |
| 9,836,083 | B2 * | 12/2017 | Ricci ...................... | H04B 1/385 |
| 10,951,621 | B2 * | 3/2021 | Arora .................. | H04L 63/0492 |
| 11,284,546 | B2 * | 3/2022 | Judy .................... | H05K 9/0015 |
| 11,547,029 | B2 * | 1/2023 | Judy .................... | H05K 9/0081 |
| 2016/0233912 | A1 * | 8/2016 | Thomas ................ | H04K 3/825 |

* cited by examiner

*Primary Examiner* — Hosuk Song
(74) *Attorney, Agent, or Firm* — Harrity & Harrity, LLP

(57) ABSTRACT

In some implementations, a security cuff/frequency blocker comprises an outer portion and a blocking material. The outer portion may include a first surface and a second surface and may be configured to be placed around or over a wireless electronic device. The blocking material may be configured to prevent a communication of a wireless signal/ frequency by the electronic device and may be located within a recess formed by the first surface and the second surface of the outer portion, or within a small pouch comprised of signal/frequency blocking material.

10 Claims, 9 Drawing Sheets

100 ⟶

100

110

150

120

170

160

140

130

100

SECURITY CUFF FOR PREVENTING COMMUNICATION OF WIRELESS SIGNALS

CROSS-REFERENCE TO RELATED APPLICATION

This patent application claims priority to Provisional Patent Application No. 63/383,300, filed on Nov. 11, 2022, and titled SECURITY CUFF FOR PREVENTING COM-MUNICATION OF WIRELESS SIGNALS." The disclosure of the prior application is considered part of and is incorporated by reference into this patent application.

BACKGROUND

A secure facility is a secure area, or potentially denied environment, such as a building, room, or a region that may or may not be friendly to American interests, or a room, where sensitive information can be viewed, processed, and discussed while preventing others from accessing the sensitive information, hearing the discussions, and/or the like. For example, a sensitive compartmented information facility (SCIF) is an enclosed area within a building that can be used to process, access, and/or store top secret/sensitive compartmented information (TS/SCI) types of classified information.

DETAILED DESCRIPTION OF EXAMPLE EMBODIMENTS

Figure 1:
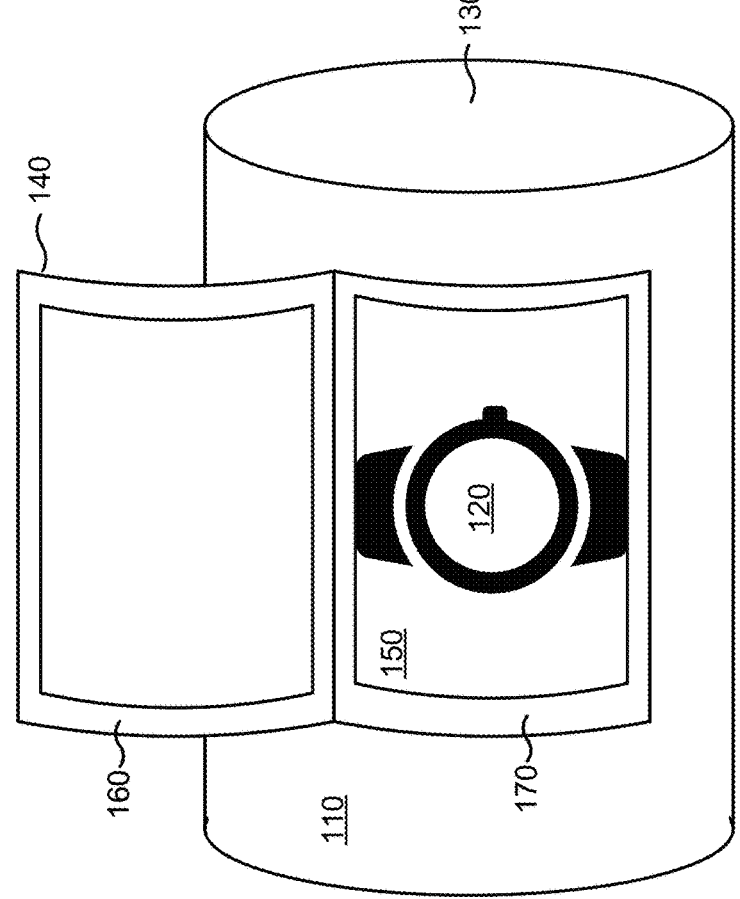
FIGS. 1-9 are diagrams of one or more example implementations of a security cuff/frequency blocking technology configured to prevent communication of wireless signals by a portable electronic device.

The following detailed description of example implementations refers to the accompanying drawings. The same reference numbers in different drawings may identify the same or similar elements.

Various security measures may be implemented to restrict access to sensitive information stored in a secure area such as a sensitive compartmented information facility (SCIF). For example, a keypad, a badge reader, a scanner, a checkpoint, and/or the like may be implemented to prevent authorized personnel from entering the secure area. Further, in some cases, authorized personnel may be prevented from bringing various electronic devices into a secure area due to their receptive or transmission capabilities. For example, to prevent the intentional or unintentional transmission of sensitive information, authorized personnel may be prevented from bringing any type of electronic device that is capable of transmitting and/or receiving a wireless signal into the secure area.

However, many types of electronic devices that are capable of transmitting and/or receiving a wireless signal perform other useful functions. For example, a wearable electronic device, such as a smart watch, fitness tracker, or hearing aids, may be configured to collect health and/or fitness related data (e.g., heart rate data, a number of steps taken by a user, and/or the like). The wearable electronic device may store the collected information in a memory of the wearable electronic device. Upon connecting to a wireless network (e.g., a local area network, a cellular network, and/or the like) and/or establishing a wireless connection to an application running on another device (e.g., an application running on a smartphone or a server device) via a wireless signal (e.g., using near field communications, such as Bluetooth or Wifi, among other examples), the wearable electronic device may transmit the collected information to the application is it paired with. Because the wearable electronic device is capable of transmitting a wireless signal, a user may be prevented from wearing the wearable electronic device within a secure area.

Some implementations described herein relate to a security cuff/frequency blocking technology that is configured to selectively prevent the transmission and/or reception of wireless signals by an electronic device. In some implementations, the security cuff/frequency blocker may be configured to be placed around/over an electronic device to prevent the electronic device from being able to transmit and/or receive a wireless signal. For example, the security cuff/frequency blocker may be configured to be placed over a wearable electronic device such as a smartwatch or a fitness tracker worn by a user. In some implementations, the security cuff may comprise an interior portion that is configured to prevent the transmission and/or reception of wireless signals. For example, in some implementations, the interior portion may be comprised of Faraday material, a metallic material, a ceramic material, and/or the like which prevents the frequency transmission of devices wirelessly. In some implementations, the security cuff may comprise an exterior portion that is configured to encase the interior portion and/or enable the security cuff to be securely placed around an electronic device. For example, the exterior portion may comprise an elastic cuff that is configured to receive a portion of a user's body (e.g., a wrist, an arm, and/or a leg, among other examples) and to be placed around an electronic device worn by the user. As a result, the security cuff may prevent the electronic device from transmitting and/or receiving wireless signals while allowing the user to utilize other functions of the electronic device within a secure area. This ability would allow the user to continue to utilize their devices(s) without fear of information leakage, network joining, or accidental downloading/uploading of other potential sensitive information. This technology will also cloak potential wireless signals given and received by body worn, i.e. wrist worn, hearing aides, smart phone cellular/Wifi/Bluetooth technology, and other Department of Defense technological devices that could be identified by security or defensive counter-technology.

FIGS. 1-9 are diagrams of one or more example implementations of a security cuff/frequency blocker 100 configured to prevent communication of wireless signals by a portable/wearable electronic device. As shown in FIGS. 1-9, in some implementations, the security cuff/frequency blocker 100 may comprise a wrist cuff/blocking pouch that is configured to prevent the communication of wireless signals (e.g., the transmission and/or reception of wireless signals) by a wearable electronic device 120 (e.g., a smart watch, a fitness tracker, a heart rate monitor, hearing aids, and/or the like) worn by a user/individual.

As shown in FIG. 1, the security cuff/frequency blocker 100 may comprise an outer portion 110. In some implementations, the outer portion 110 may comprise a cylindrical shape forming an interior recess 130 comprised of the frequency blocking technology. The interior recess 130 may configured to receive a portion of a user's body upon which the user is wearing a wearable electronic device 120. For example, as shown in FIG. 1, the interior recess 130 may be configured to receive an arm of a user, or behind the ears of the potential user (not shown) to enable the security cuff/ frequency blocker/blocking pouch 100 to encompass the wearable electronic device 120.

In some implementations, the outer portion 110 may comprise a flexible material that can be stretched to receive the arm of the user and then retracts to fit securely around the wearable electronic device 120. For ear worn devices, the user will have the option to place their hearing aids into small discrete pouches that will block the wireless transmission of signals while still being able to utilize their devices for hearing in a secure facility. For example, the outer portion 110 may comprise an elastic, a rubber, a polyester, and/or another type of flexible material that will encompass the users device(s) while in a secure facility/denied environment.

Figure 2:
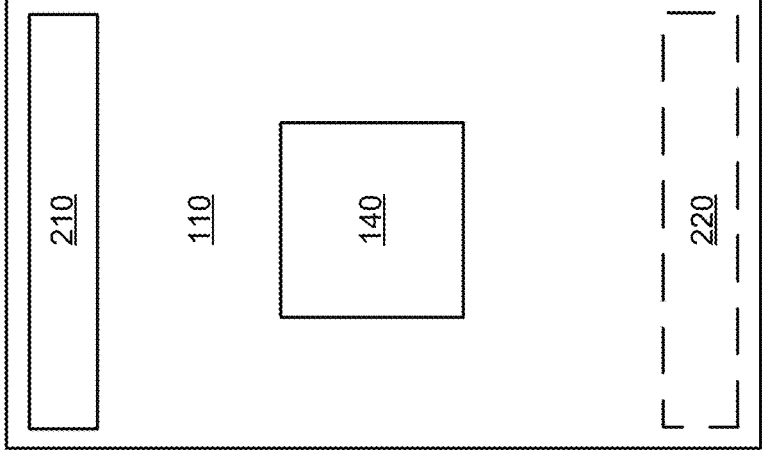

In some implementations, the outer portion 110 may comprise a non-flexible material and/or may comprise a non-cylindrical shape that can be wrapped around a portion of the user's body. For example, as shown in FIG. 2, the outer portion 110 may comprise a rectangular shape and may include a set of Velcro, fast tec, button, zipper, magnetic, etc. fasteners 210, 220. The set of fasteners may be configured to securely couple opposing ends of the outer portion 110 when the outer portion 110 is wrapped around a portion of the user's body. For example, the set of fasteners 210, 220 may comprise a set of snaps, hook and loop fasteners, button, zipper, and/or another type of fastener located on opposite sides of the outer portion 110 to enable a male portion (e.g., fastener 210) to be received by a female portion (e.g., fastener 220) when the outer portion 110 is wrapped around a wrist, a leg, or a chest, behind the ear, among other examples, of the user.

Figure 3:
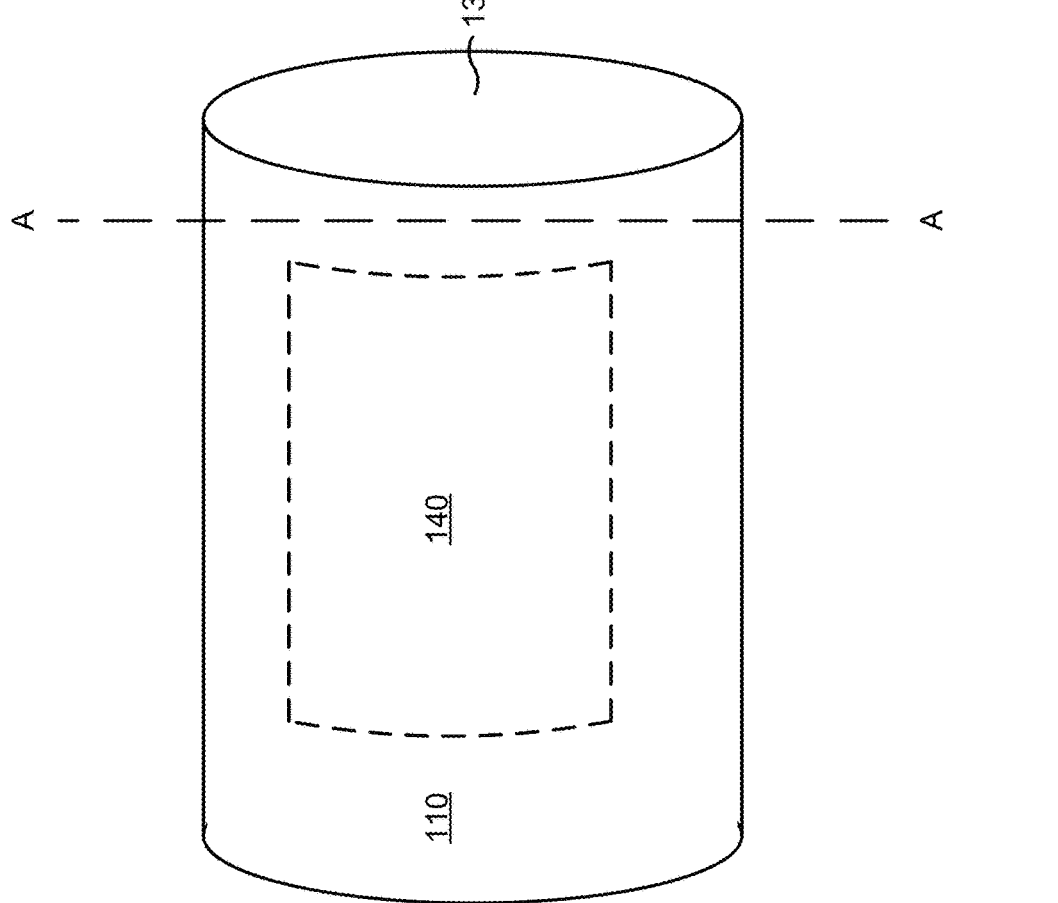

Returning to FIG. 1, in some implementations, the security cuff 100 may include a flap portion 140 and a window portion 150. In some implementations, the flap portion 140 may be configured to be moved from an open position (as shown in FIG. 1) to a closed position (as shown in FIG. 3). In some implementations, the flap portion 140 may include a set of fasteners 160, 170 that enable the flap portion to be securely coupled to the outer portion 110 when the flap portion 140 is in the closed position.

For example, the flap portion 140 may include a first fastener 160 positioned around an outer perimeter of the flap portion 140. A corresponding second fastener 170 may be positioned adjacent to a perimeter of the window portion 150. The second fastener 170 may be configured to receive the first fastener 160 and to securely couple the flap portion 140 to the outer portion 110 when the flap portion 140 is in the closed position, as indicated by the dashed lines shown in FIG. 3.

In some implementations, as shown in FIG. 1, the window portion 150 may be configured to enable the user to view and/or access the wearable electronic device 120 without having to remove the security cuff/frequency blocker 100. For example, the window portion 150 may be configured to be located over the wearable electronic device 120 when the security cuff 100 is worn by the user. In some implementations, the window portion 150 may comprise a slot or rectangular space formed through the outer portion 110. In some implementations, the window portion 150 may comprise a translucent material having one or more properties that at least partially attenuate a wireless signal. In this way, the window portion 150 may enable a user to view the wearable electronic device (e.g., to see what time it is) while still enabling the security cuff 100 to prevent the wearable electronic device from transmitting and/or receiving a wireless signal, i.e. check the time.

Figure 4:
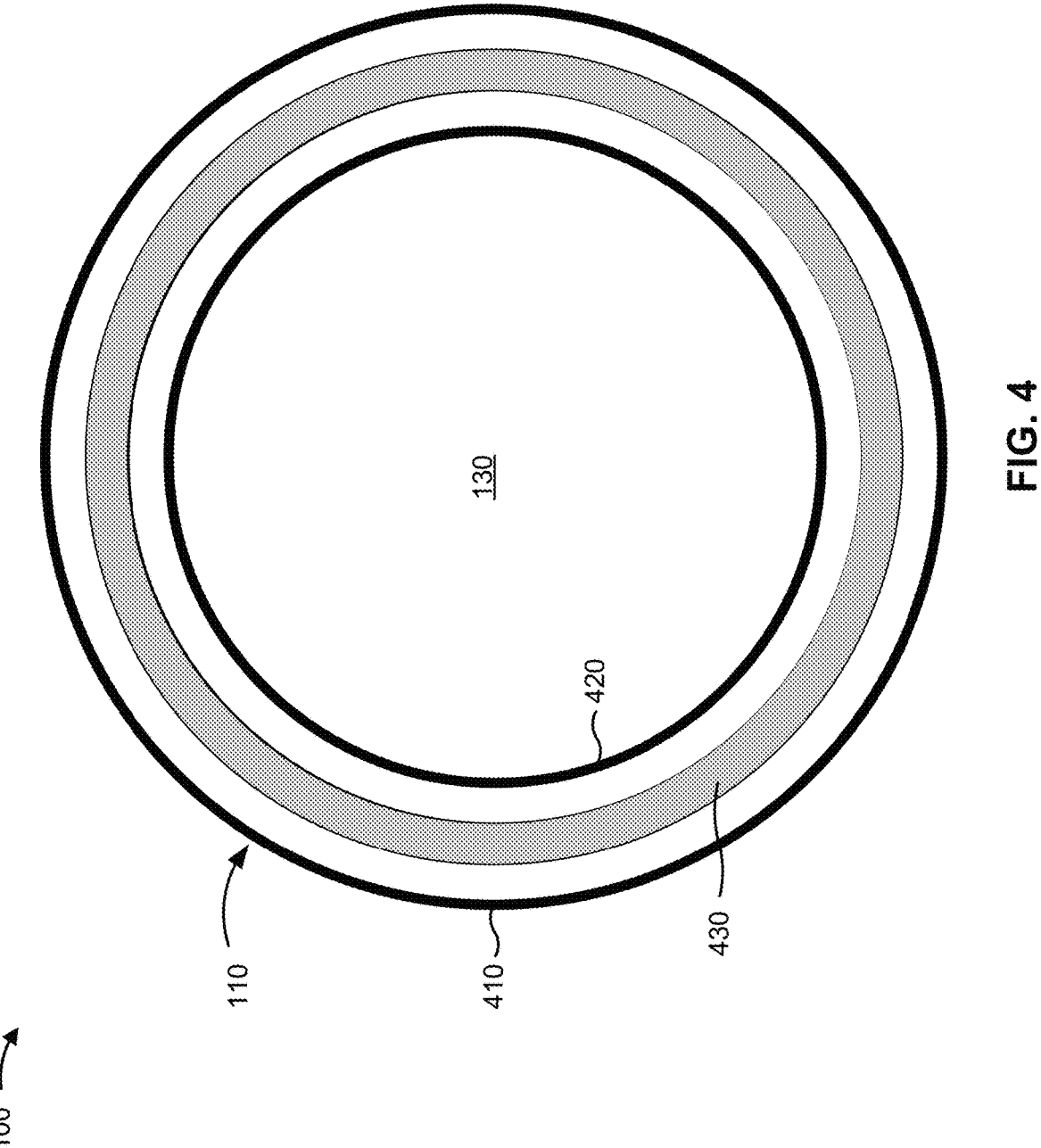

FIG. 4 illustrates a portion of the security cuff 100 cut along line AA shown in FIG. 3. As shown in FIG. 4, the outer portion 110 comprises a first surface 410 and a second surface 420. The first surface 410 may be coupled to the second surface 420 to encase a frequency blocking material 430 within the outer portion 110. The frequency blocking material 430 may be configured to prevent at least a portion of a wireless frequency/signal from propagating through the security cuff/frequency blocker 100 (e.g., through the outer portion 110 and/or the blocking material 430).

In some implementations, the frequency blocking material 430 may comprise one or more metallic elements. For example, the blocking material 430 may comprise a Faraday material. The Faraday material may be comprised of a flexible metallic fabric made of a blend of cotton and/or polyester with nickel, copper, silver, a metal-carbon compound, and/or the like.

In some implementations, the blocking material 430 may extend along an entire width of the outer portion. In this way, the blocking material 430 may surround and/or encompass the wearable electronic device when any portion of the outer portion 110 is positioned over the wearable electronic device 120. Additionally, or alternatively, the blocking material 430 may extend only along a portion of the width of the outer portion.

Figure 5:
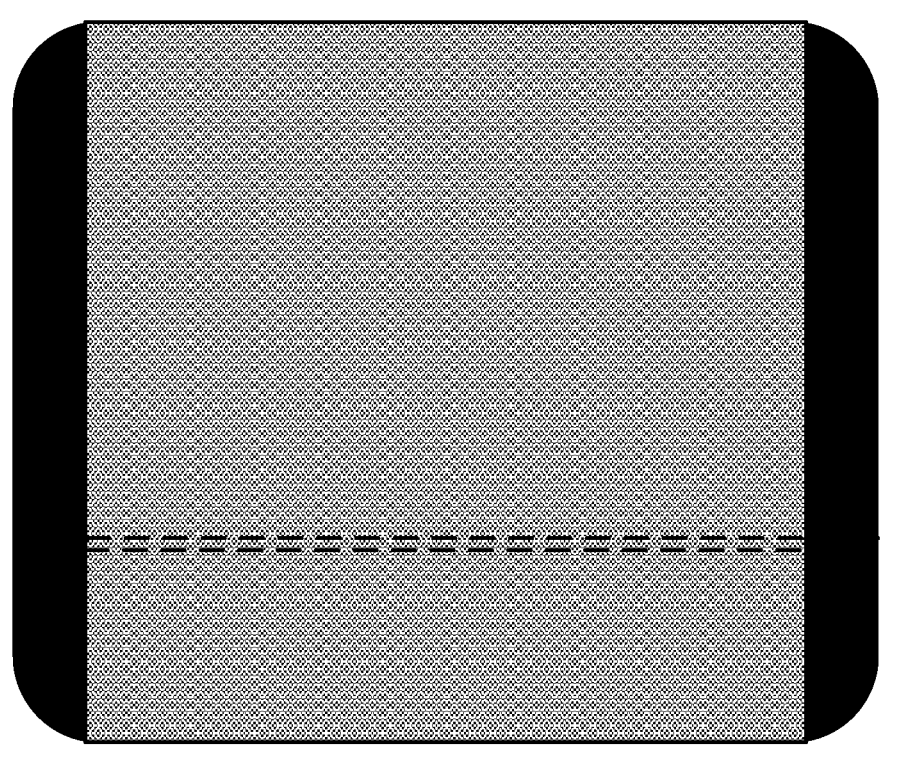

FIG. 5 is a diagram illustrating an interior portion of a security cuff/frequency blocker, according to one aspect of the invention. In some implementations, the security cuff/frequency blocker shown in FIG. 5 may correspond to a small security cuff/frequency blocker.

Figure 6:
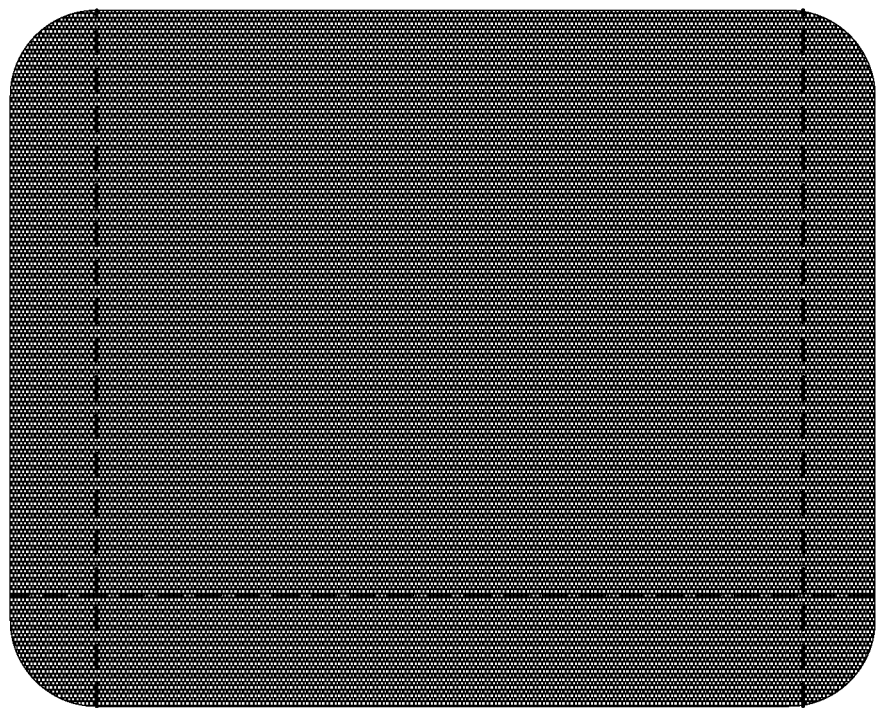

FIG. 6 is a diagram illustrating an outer portion of the security cuff/frequency blocker shown in FIG. 5.

Figure 7:
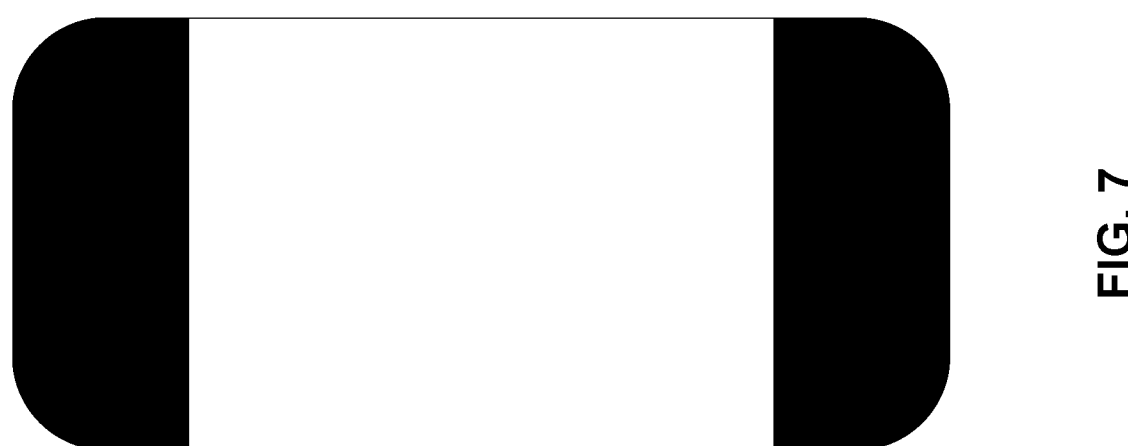

FIG. 7 is a diagram illustrating an interior portion of a security cuff/frequency blocker, according to one aspect of the invention. In some implementations, the security cuff/frequency blocker shown in FIG. 7 may correspond to a large security cuff/frequency blocker relative to the security cuff/frequency blocker shown in FIGS. 5 and 6. For example, a large security cuff/frequency blocker may be configured to be worn by a user that is larger than a user for which the small security cuff/frequency blocker is configured to be worn by.

Figure 8:

FIG. 8 is a diagram illustrating an outer portion of the security cuff/frequency blocker shown in FIG. 7.

Figure 9:
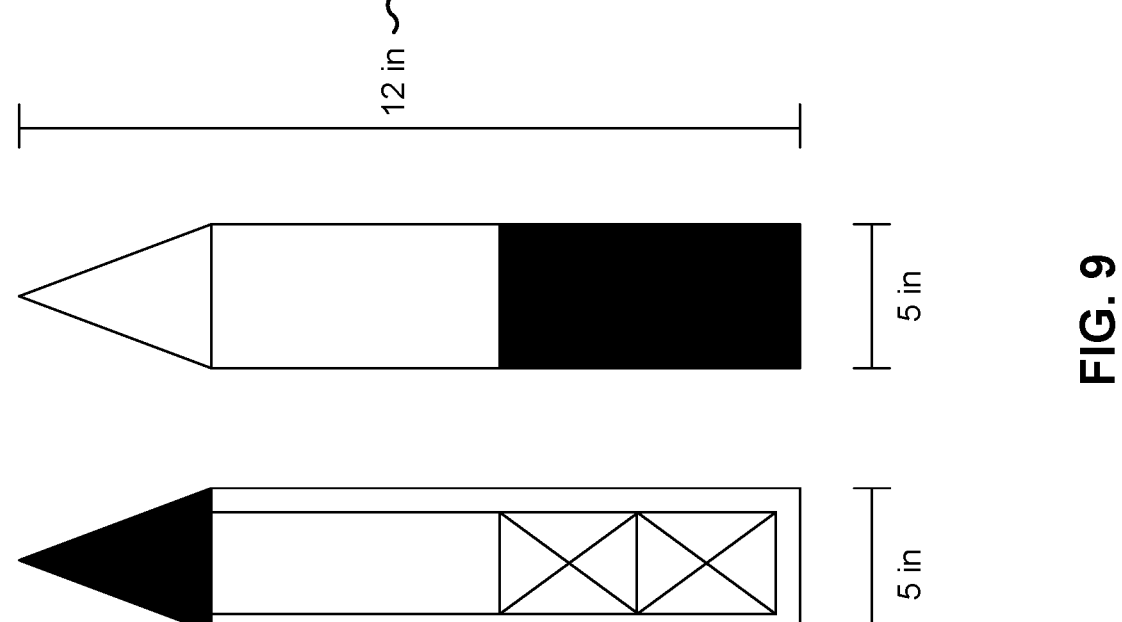

FIG. 9 is a diagram illustrating a security cuff/frequency blocker, according to one aspect of the invention.

Although the security cuff/frequency blocker is described herein having a particular shape and/or configured to be placed around a particular type of electronic device, in practice, the security cuff/frequency blocker may comprise a shape and/or may be configured to be placed around, or receive, a different type of electronic device, i.e. hearing aids, smart phones, fitness tracking rings, etc. For example, the security cuff may comprise a security sleeve having a rectangular shape and may be configured to be placed around, and/or to receive within an interior portion of, a smartphone, tablet, hearing aid, fitness tracking ring (as a fingerless Faraday type glove).

As indicated above, FIGS. 1-9 are provided as an example. Other examples may differ from what is described with regard to FIGS. 1-9. The number and arrangement of devices shown in FIGS. 1-4 are provided as an example. In practice, there may be additional devices, fewer devices, different devices, or differently arranged devices than those shown in FIGS. 1-9. Furthermore, two or more devices shown in FIGS. 1-9 may be implemented within a single device, or a single device shown in FIGS. 1-9 may be implemented as multiple, distributed devices. Additionally, or alternatively, a set of devices (e.g., one or more devices) shown in FIGS. 1-9 may perform one or more functions described as being performed by another set of devices shown in FIGS. 1-9.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A security cuff/frequency blocking technology comprising:
   an outer portion configured to be placed around an electronic device, wherein the outer portion includes a first surface and a second surface;
   a blocking material configured to prevent a communication of a wireless signal by the electronic device to other devices whilst in a secure or denied environment, wherein the first surface is coupled to the second surface to encase the blocking material within the outer portion;
   a flap portion configured to move from an open position and a closed position;
   a windowed portion, wherein the windowed portion is covered by the flap portion when the flap portion is in the closed position; and
   a set of fasteners configured to couple the flap portion to the outer portion when the flap portion is in the closed position.

2. The security cuff/frequency blocker of claim 1, wherein the blocking material comprises a Faraday material.

3. The security cuff/frequency blocker of claim 1, wherein the electronic device is configured to be worn by a user to one or more of track fitness goals or assist with heath protocols.

4. The security cuff/frequency blocker of claim 1, wherein the blocking material comprises a metallic composition that is configured to attenuate at least a portion of the wireless signal.

5. The security cuff/frequency blocker of claim 1, wherein the outer portion comprises a flexible material that is configured to retain the security cuff/frequency blocker on an arm, behind an ear, in a pocket, or around a device, of a user.

6. A device comprising:
   an outer portion configured to be placed around an electronic device, wherein the outer portion is configured to encase a blocking material between a first surface and a second surface of the outer portion, wherein the blocking material is configured to prevent a communication of a wireless signal by the electronic device to other devices;
   a flap portion that includes a windowed portion, wherein the flap portion is configured to move from an open position and a closed position, wherein the windowed portion is covered by the flap portion when the flap portion is in the closed position; and
   a set of fasteners configured to couple the flap portion to the outer portion when the flap portion is in the closed position.

7. The device of claim 6, wherein the blocking material comprises a Faraday material.

8. The device of claim 6, wherein the electronic device is configured to be worn by a user to one or more of track fitness goals or assist with heath protocols.

9. The device of claim 6, wherein the blocking material comprises a metallic composition that is configured to attenuate at least a portion of the wireless signal.

10. The device of claim 6, wherein the outer portion comprises a flexible material that is configured to retain the device on an arm, behind an ear, in a pocket, or around a device, of a user.

* * * * *